United States Patent [19]

Poubeau

[11] 4,211,452
[45] Jul. 8, 1980

[54] INERTIA WHEEL

[75] Inventor: Pierre Poubeau, Le Pecq, France

[73] Assignee: Societe Nationale Industrielle Aerospatiale, Paris, France

[21] Appl. No.: 886,496

[22] Filed: Mar. 14, 1978

[30] Foreign Application Priority Data

Mar. 15, 1977 [FR] France .................. 77 07685

[51] Int. Cl.² .......................................... F16C 39/00
[52] U.S. Cl. ................................. 308/10; 74/5.46; 244/165; 310/74
[58] Field of Search ............... 308/10; 310/74, 153, 310/80, 266, 198; 244/165, 166; 74/5.46

[56] References Cited

U.S. PATENT DOCUMENTS

| 3,790,235 | 5/1974 | Kaiser | 308/10 |
| 3,888,553 | 6/1975 | Wehde | 308/10 |
| 3,955,858 | 5/1976 | Poubeau | 308/10 |
| 4,077,678 | 3/1978 | Studer | 308/10 |
| 4,082,376 | 4/1978 | Wehde | 308/10 |

FOREIGN PATENT DOCUMENTS 1287341  8/1972  United Kingdom ...................... 308/10

OTHER PUBLICATIONS

Magnetic Bearings Support Satelite Flywheel; 9/30/73; Machine Design, vol. 45, No. 23.
Wissenschfftlich Bericht AEG-Telefunken; 1971; vol. 44; pp: 21-25.

Primary Examiner—R. Skudy
Attorney, Agent, or Firm—Karl W. Flocks

[57] ABSTRACT

An inertia wheel more particularly adapted to space applications. It includes the combination of a peripherical type of motor with permanent magnet on the rotor and ironless winding on the stator. The current of said winding is switched electronically by an amplitude modulation system, associated to a reactance coefficient varying circuit, and reversal of the direction of rotation of which is achieved by permutation of the control circuits. There are also provided bearings formed by a passive radial magnetic centering device and a redundant active axial magnetic centering device slaved to an axial rate detector.

7 Claims, 10 Drawing Figures

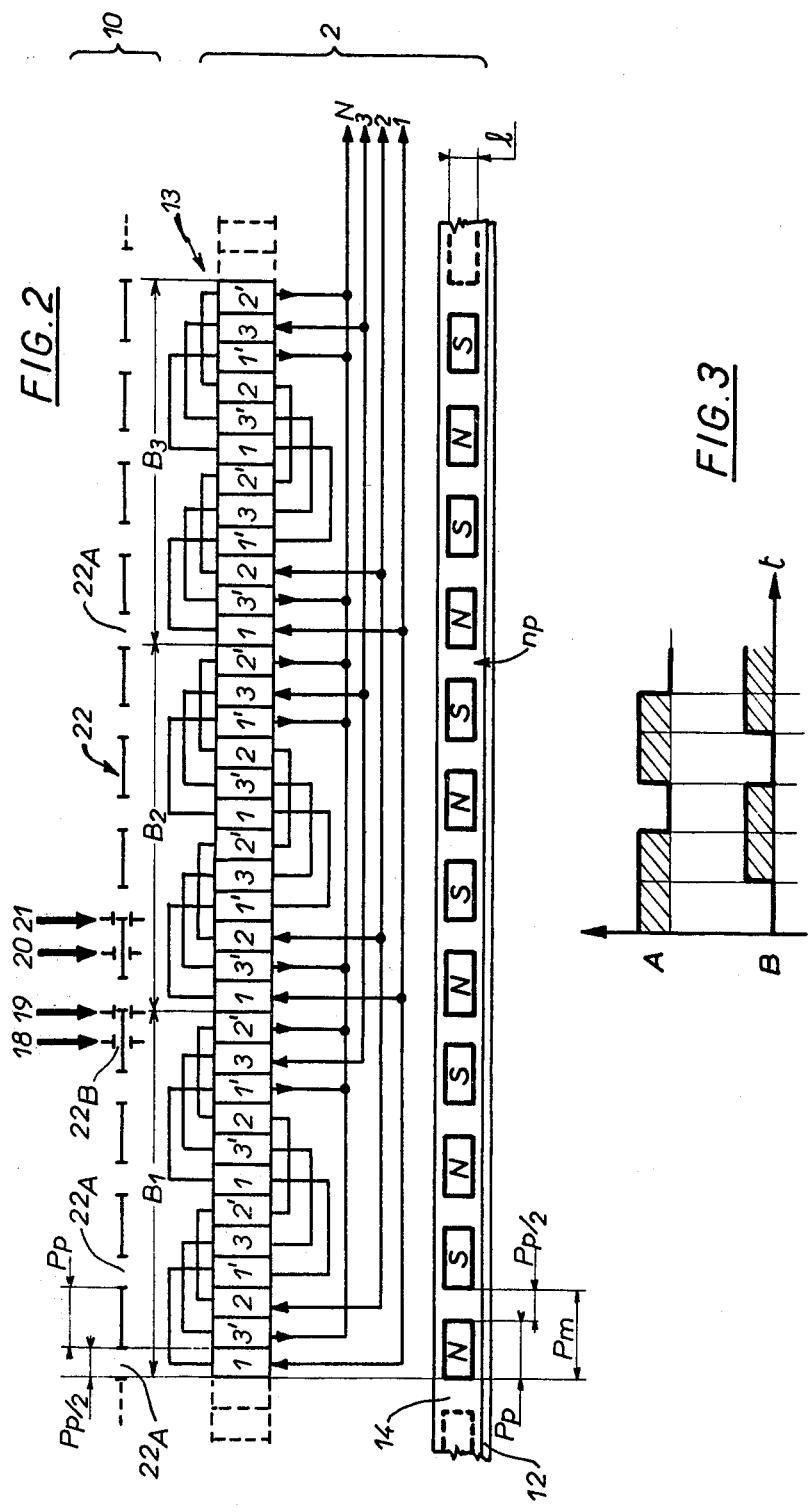

STEERING COMMANDS

INERTIA WHEEL

The present invention relates to inertia wheels and more particularly to space applications thereof.

As is known, inertia wheels for space applications can be used as reaction wheels or as momentum wheels, depending on the desired effect.

Reaction wheels are used either singly or in twos or threes in one-, two- or three-axis steering systems and operate as vernier systems at zero mean speed in both directions of rotation, their maximum speeds not being very high as a rule.

In a specific application for storing energy from solar panels, two momentum wheels may be set in contrarotation about the same axis, in which case the rotation speed is as high as possible.

Inertia wheels, whether devised as reaction wheels or momentum wheels, and a fortiori all rotating bodies subjected to the same stresses, have in common a rotor-driving motor and bearings supporting the rotor, and in the specific application currently made thereof the ratio of the moment of inertia to the total mass must be as high as possible.

Research for optimum solutions to the various aspects mentioned above has in the past led the Applicant to file several patent applications. French Pat. No. 69.24210 filed July 16, 1969, in particular, describes a type of motor with peripheral permanent magnets and a stator devoid of ferromagnetic material which obviates losses due to hysteresis and eddy currents and eliminates the unwanted axial or radial negative stiffness which invariably appears when a ferromagnetic material is present in the motor stator.

However, the bearings used with a motor of this kind necessarily implied friction, and in order to eliminate the problems inherent to wear and improve the reliability and useful life of the equipment, the Applicant filed U.S. patent application Ser. No. 537,835 on Dec. 31, 1974 that has been granted on May 11, 1976 under U.S. Pat. No. 3,955,858 with a view to providing the rotor with passive-centering magnetic bearings associated to axial slaving means.

According to a succint description of a motor of this type, the rotor bore alternating magnets arranged in sectors opposite a stator wound with conducting axial turns, whereby reversing of the current in successive turns had a cumulative effect on the electromotive forces which caused the armature to rotate in accordance with Laplace's law.

The switching process for reversing the current in the stator turns was obtained with ancillary coils which delivered signals identifying the polarities of individual magnets opposite the stator turns.

However, because the utilization of such a switching system proved difficult when the number of turns was increased and the same were arranged overlapping one another in order to increase the number of electromotive-force-generating active zones, the Applicant was led to devising a better-adapted type of electrodynamic machine which is partly the object of the present patent application.

Further, it is to be noted that in the case of the magnetic bearings described in one of the above-mentioned patent applications, the radial magnetic centering of the rotor was passive while the axial magnetic centering system employed active slaving means the input signal to which was a signal delivered by an axial rate detector.

However, for various reasons connected with redundancy problems, the Applicant has been likewise led to defining in the present patent application a piece of equipment better suited to the existing problem.

Broadly speaking, the subject inertia wheel of this invention is characterized essentially by the combination: firstly, of a peripheral type of motor with permanent magnet on the rotor and ironless winding on the stator the current through which is swtiched electronically by an amplitude modulation system, associated to a reactance coefficient varying circuit, and reversal of the direction of rotation of which is achieved by permutation of the control circuits; and secondly, bearings formed by a passive radial magnetic centering device and a redundant active axial magnetic centering device slaved to an axial rate detector.

Further characteristics, advantages and particularities of the invention will emerge from the description which follows with reference to the accompanying nonlimitative exemplary drawings, showing how the said invention can be carried into practice in the preferred form of a satellite inertia wheel capable of operating in both directions of rotation, that is, an inertia wheel devised as a reaction wheel.

In the drawings:

FIG. 2 is a developed diagrammatic illustration of the motor section of the wheel shown in FIG. 1;

FIG. 3 is a diagram showing the appearance, subsequent to decoding, of the signals delivered by the detectors for detecting the instants of switching of the sets of coils in the motor of FIGS. 1 and 2;

Figure 1:
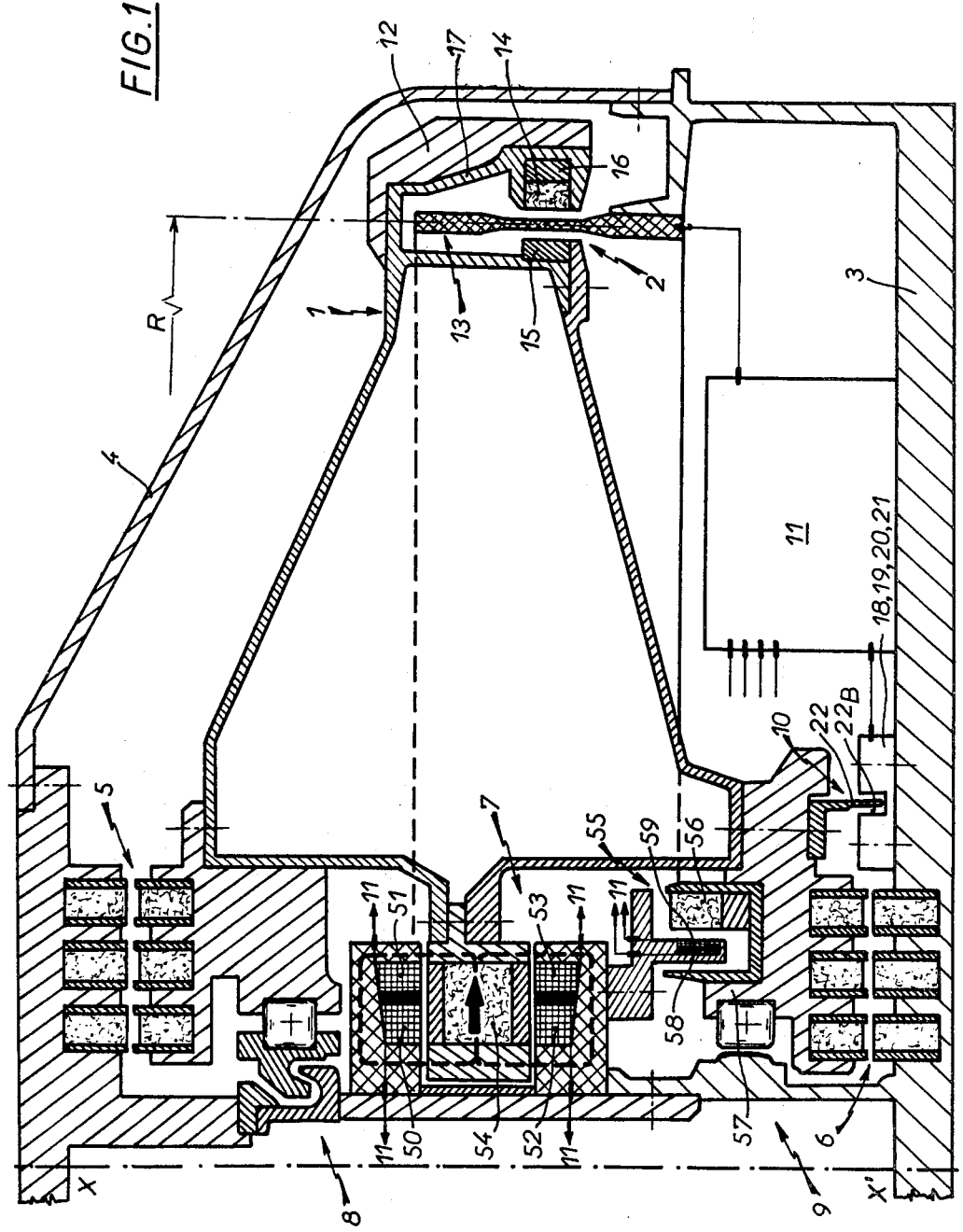
FIG. 1 is an axial half-sectional view of a reaction wheel according to this invention in its preferred form of embodiment.

An inertia wheel according to this invention, shown by way of example in axial half-section on FIG. 1, basically includes a flywheel 1 rotating about an axis xx', a motor generally designated by reference numeral 2 with its switching ring fast with the rotor generally designated by reference numeral 10, a base 3 and an enclosure 4. The flywheel or rotor 1 is supported in upper and loer radially passive magnetic bearings 5 and 6, respectively, and by an axial slaving device or "actuator" generally designated by reference numeral 7, while upper and lower back-up mechanical bearings 8 and 9 respectively complete the reaction wheel assembly together with the electronic unit 11. Said back-up bearings are preferably formed by ball-bearings supported by the rotor and capable of bearing against appropriate parts of the stator in certain special circumstances such as during launching or in the event of failure of the magnetic centering devices.

Generally speaking, a satellite reaction wheel is characterized by possible controlled rotation in both directions from zero speed to a moderate maximum speed of about 3000 rmp, and the angular momentum H can vary from 0.1 Nms to several hundred Nms, while the mass, which is of the order of 2 kg for 1 Nms, increases with the angular momentum. Further, losses incurred at the bearings are minimized by the use of magnetic bearings.

In the preferred embodiment of the invention to be described hereinbelow, the motor section proper, designated by reference numeral 2, has its fixed portion or stator formed by a winding 13, and its movable portion or rotor by a ring 14 of magnets of alternating radial polarity and ferromagnetic rings 15 and 16 enclosing the magnetic flux which crosses the air gap.

It is a particularity of this invention that the flywheel fast with the motor rotor 1 preferably has an adaptable rim 12 of variable mass. This motor section proper, referenced 2 on FIG. 1 and shown diagrammatically in developed form on FIG. 2 and fragmentally on FIGS. 4 and 5, includes an essential element in the form of winding 13 the connection method of which is peculiar to this invention.

Figure 4:
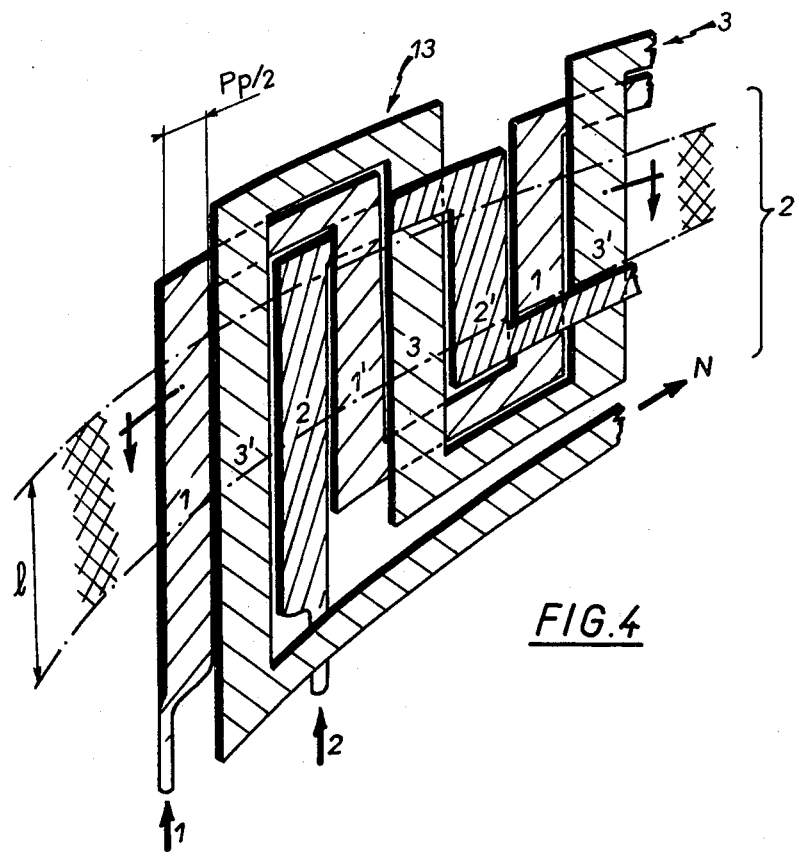
FIG. 4 is a diagrammatic detail view in perspective of the special arrangement of part of the motor winding, the sole purpose of the shadings being to distinguish between the different winding coils.
Figure 5:
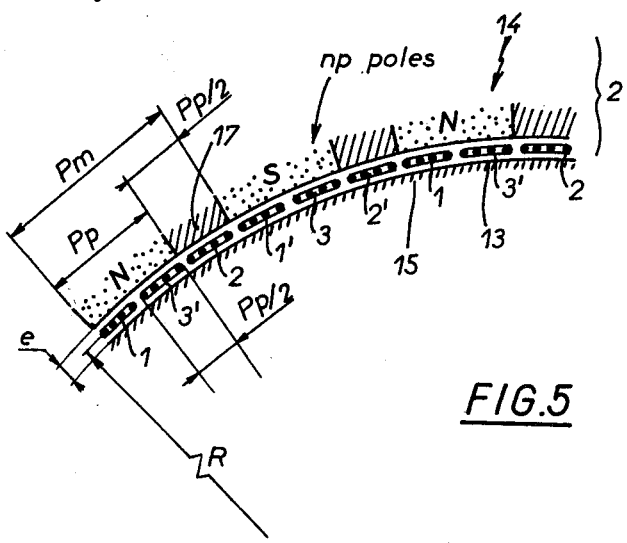
FIG. 5 is a fragmental sectional view of the portion of the winding in FIG. 4.

As shown in FIGS. 2, 4 and 5, the winding turns, having parallel active parts "l" axially arranged over a circumference of radius R, are formed into coils constituted by pairs from a set of "ascending" turns and a set of "descending" turns. These coils are additionally interconnected in sets of coils in a manner dependent on the even number of magnet poles n p, the number of coils nb being given, for example, by the expression 3np/2, that is to say that three times np/2 coils are connected in series.

The magnets are arranged over ring 14 in such manner that their distribution and their polarities 14 N, 14 S, 14 N ... be reversed at each magnetic step Pm, that their width be equal to the pole pitch $P_P$ and that the resulting spacing be equal to $P_P/2$, thereby leading to the relation $Pm=3P_p/2$.

Further, the "ascending" and "descending" turns of each coil are of width $P_p/2$ and the interleaving of the coils forms an electrical diagram as shown in FIG. 2. Thus, on FIG. 2, the successive sets of turns can be read from left to right as the sequence 1, 3', 2, 1', 3, 2', 1, 3' ... or, from right to left, in the reverse sequence, it being noted that the electrical outputs of the coils are arranged star-fashion.

Manifestly, the magnets must be rigidly restrained in relation to one another and be strongly secured to the ring 14, this being accomplished with appropriate means and nonmagnetic materials 17 well known to the specialist in the art.

Operation proper of the motor is obtained in the manner to be described hereinafter with reference to the previously-mentioned diagrams, on the basis of the following values appropriate to a reaction wheel with an angular momentum H=2 Nms adaptable from H=1 to H=5 Nms by adjusting the variable-mass rim 12.

Torque $\tau = \pm 0.1$ Nm
Mass < 4 kg
R = 0.1085 m
l = 85·10$^{-4}$ m
B (magnetic field) = 0.3 T (in the air gap e)
$\Omega = \pm 330$ rad/sec (3160 rpm)
U = 24 V
W = 50 watts (motor 33 W, ancillaries 17 W)
np = 12 (alternating N and S poles)
nb = 3·12/2 = 18 coils Pm = 360/12 = 30°
$P_p$ = Pm/3 = 30/3 = 10°

For a required torque $\tau$ of 0.1 Nm, the necessary force F is given by $$F = \frac{0.1 \text{ (Nm)}}{0.108 \text{ (m)}} = 1 \text{ N}$$

The current flowing through the active turns placed in the magnetic field must then be:

$$A = \frac{0.1 \text{ Nm}}{\underset{\text{(m)}}{0.108} \cdot \underset{\text{(m)}}{85 \cdot 10^{-4}} \cdot \underset{\text{(T)}}{0.3}} = 4 \text{ amperes}$$

and the corresponding power developed is:

$$W = \underset{\text{(Nm)}}{0.1} \cdot \underset{\text{(rad/sec)}}{330} = 33 \text{ watts}$$

Further, since the active working length of the turns per set of eight coils is $$\frac{1 \text{ N}}{\underset{\text{(T)}}{0.3} \cdot \underset{\text{(A)}}{4}} = 0.8 \text{ m}$$

then
 the total active length is 0.8×3=2.40 m,
 the active length per coil is 0.8/8=0.1 m,
 the number of turns is 0.1/0.0085≃12, and
 the number of turns per coil must be 12/2=6.

With regard to current switching on the sets of coils, as is shown in FIGS. 1 and 2 this is achieved through the agency of two so-called main detectors 18 and 19 supported by two so-called redundant detectors 20 and 21, all associated to a ring 22 fast with rotor 1 and formed with slots 22A the functioning of which will be explained in greater detail hereinafter.

Figure 6:
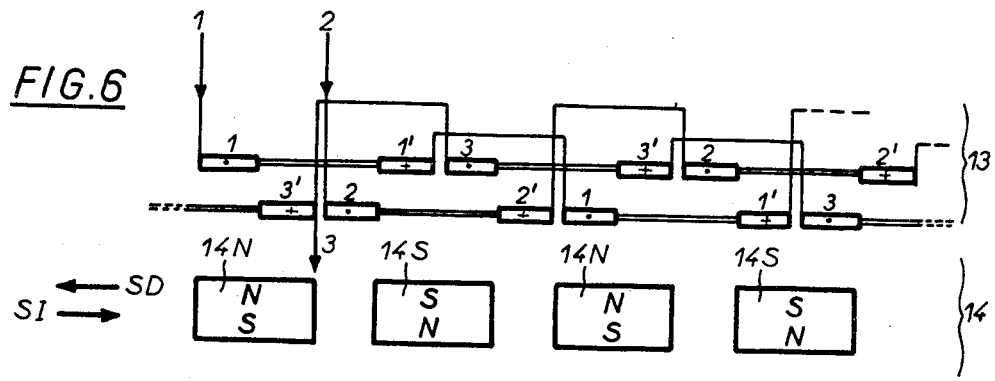
FIGS. 6, 6A, 6B and 6C are explanatory diagrams respectively showing how the rotor magnets transit past the stator winding; the characteristic appearance of the back electromotive force produced on the sets of coils; and the method of switching the motor in order to obtain either forward or reverse rotation.

In the first place, the spatial arrangement of these elements as shown in FIG. 2 is such that the switching windows 22A each have a width $P_p/2$ and are spaced apart by a width $P_p$ while the detectors 18, 19 and 20, 21 are respectively spaced $P_p/2$ apart and the detectors 19 and 20 $P_p$ apart. Thus, as illustrated in FIG. 6, the magnets 14 N, 14 S ... transit past the winding 13 whose sets of coils B1, B2, B3 each have 1—1', 2—2', 3—3' turns, while the back electromotive force engendered at the terminals of the sets of coils must be cut off at particular switching moments the signals for which are generated by detectors 18 and 19.

The detectors 18 and 19 deliver rectangular signals the appearance of which, after decoding, is shown on the diagram in FIG. 3 at A for detector 18 and at B for detector 19. To this end, an appropriate electronics (not shown) modulates the rectangular signals in the manner to be described hereinafter.

Figure 6A:
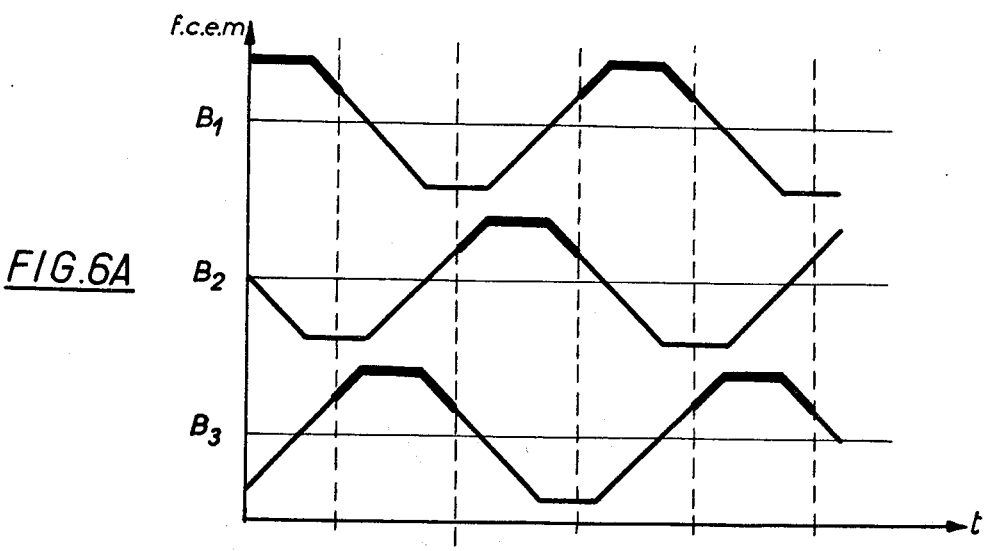
Figure 6B:
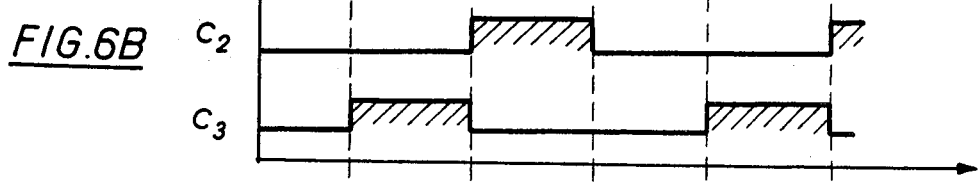
Figure 6C:
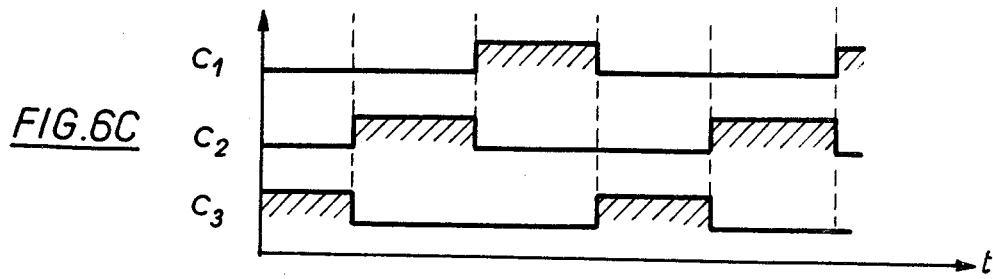
Figure 7:
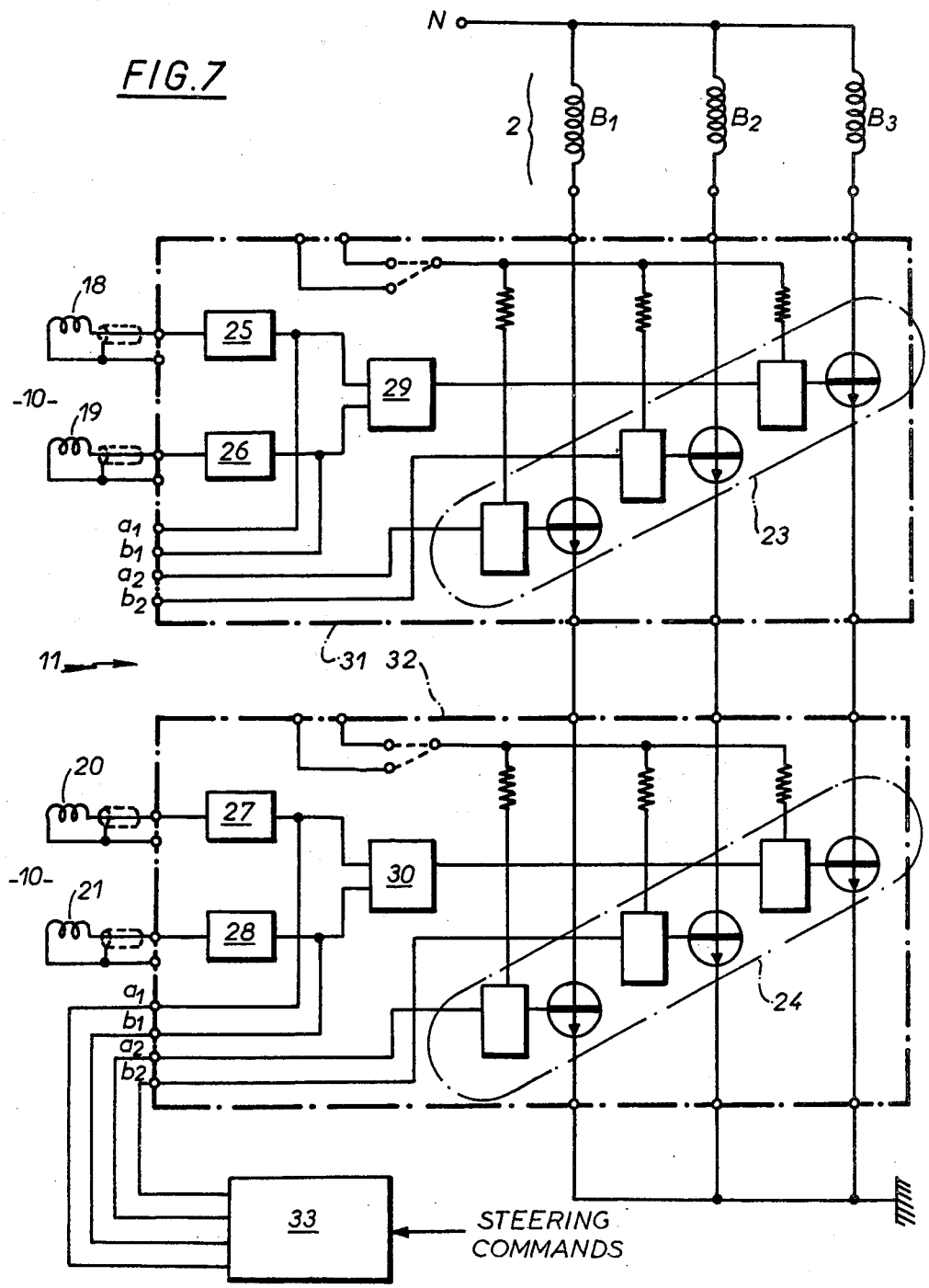
FIG. 7 is a block diagram showing the control circuits of the motor winding.

1 MHz generators 25, 26 and 27, 28 (see also FIG. 7) contained in boxes 31 and 32 feeding detectors 18, 19 and 20, 21 the reactance 22B of which (see FIGS. 1 and 2) closes through the slotted rotating ring 22 in such manner that the modified quality factor resulting from the presence of windows 22A results in signals the appearance of which is shown in FIGS. 6B and 6C.

These signals are then rectified and filtered by units 29 and 30, then converted into a logic command capable of being applied to the solid-state power selectors 23 and 24 controlling the sets of coils B1, B2 and B3.

Reverting to FIGS. 6 and 6A, it will be noted that the back electromotive force produced on sets of coils B1, B2 and B3 has a typical trapezoidal form due to the special relative disposition of the coils and the magnets.

Correlatively, energization of the coils with appropriate switching will set the magnets in motion and the direction of this motion will depend on the order in which the current flowing through the sets of coils is switched. Thus, if the switching is such that the order in which the circuits are opened causes $C_1 \rightarrow B_1$, $C_2 \rightarrow B_2$, $C_3 \rightarrow B_3$ (FIG. 6B), rotation will take place in the forward direction (right to left).

Conversely, if the order in which the circuits are opened is $C_1 \rightarrow B_2$, $C_2 \rightarrow B_3$, $C_3 \rightarrow B_1$ (FIG. 6C), then rotation will take place in the reverse direction (left to right) by reason of a circular permutation on the controls.

The rotation reversing or, where necessary, the zero speed command are delivered by a unit 33 connected to inputs a1, a2, b1 and b2 and receiving steering commands from a steering data computer (not shown).

For cases involving commands for only one direction of rotation for a momentum wheel, for example, electrical bridges or "straps" can be placed across the lines a1, a2 and b1, b2. It is to be noted furthermore that unit 32 is redundant with respect to unit 31.

Concerning the suspension of rotor 1, this is provided radially, as shown in FIG. 1, by concentric magnetic rings forming upper and lower bearings 5 and 6 respectively, while the associated actuator/rate detector generally designated by reference numeral 7 generates the force required for axial slaving.

As shown in FIG. 1, this actuator includes basically, on the rotor side, an annular magnet 54 having a radial magnetic field and, on the stator side, a first set of two concentric coils 50 and 52 and a second set of two redundant concentric coils 51 and 53.

The magnetic fields of the magnets close in the manner indicated by the arrow on FIG. 1, and the coils operate by adding their magnetic field in the appropriate sense to the magnetic field of the magnet, and this in response to signals from the rate detector 55 to be described in greater detail hereinbelow.

The rate detector 55 is formed basically of a ring of magnets 56 fast with the rotor and generating a radial magnetic field. This field closes through a yoke 57, while a redundant dual coil 58, 59 fast with the stator is so placed in said magnetic field that any axial shift by magnets 56 relative to coils 58-59 generates rate signals which are applied in the appropriate sense to the electronics unit 11 for controlling the actuator, whereupon the same corrects the axial deviations noted.

Although the axial portion of the slaving system is not described in detail herein, it is to be noted that the electric signals generated by the rate detector are in the region of 20 volts/m/sec and that the axial steepness of the actuator is of the order of $300 \cdot 10^3$ Nm.

Obviously, the present description by no means limits the scope of this invention to space applications in the form of a reaction wheel or a momentum wheel.

Further, the motor can have any even number of poles with an appropriate number of sets of coils or coils.

It is to be noted moreover that the switching method described hereinbefore, which utilizes a 1 MHz-modulated current chopped into signals, was adopted in the present space application because of the advantages it offers, such as imperviousness to cosmic radiation for example, but it is to be understood that it can be replaced by any convenient alternative system, such as one utilizing photodiodes for instance.

Furthermore, since the motor can operate as a generator, the electromotive force it produces as a result can be used as a voltage source for driving the axial slaving means; the energy required for this function would then be tapped from the rotor momentum, thereby enabling the axial slaving means to operate for several tens of minutes or even several hours, depending on the angular momentum and rotation speed of the rotor, before the rotor falls back onto its back-up bearings. Such an operating mode provides added reliability in the event of a temporary failure of the electric power supply to the slaving system.

It goes without saying that the present invention is in any event described and illustrated solely with respect to a preferred embodiment and that changes and substitutions may be made without departing from the scope of the invention, as set forth in the appended claims.

I claim:
1. An inertia wheel comprising
   a flywheel having an adaptable rim of variable mass;
   a motor for peripherally driving said flywheel including
   a rotor fast with said flywheel and formed on said rim with a magnetic field of flux from said rotor formed across an air gap within which is a ring of an even number n of permanent magnets p of radial magnetization with alternating polarities, having a peripheral magnet width $P_p$ and a magnet pitch Pm linked by the relationship $Pm = 3P_p/2$, and
   a stator including a winding having sets of coils interconnected in pairs of ascending and descending turns of width $P_p/2$ with the number of coils being three times the even number n of permanent magnets p divided by two and thereby the expression of number of coils equals 3np/2,
   said rotor located relative to said stator to place said winding of said stator where the radial magnetic field of flux of said rotor crosses the active turns of width $P_p/2$ of said winding of said stator,
   switching means connected to said stator for switching the current on said sets of coils of said stator winding causing rotation of said rotor;
   a control means associated with said switching means for detecting the angular position of said rotor and said flywheel;
   magnetic bearings of the radially passive and axially active type mounted on said flywheel and said rotor and suspending said rotor on said flywheel; and
   an axial rate detector means for detecting the axial rate of said rotor connected to said stator relative to said rotor and an actuator connected between said rotor and said stator and associated with said detector means, each having redundant coils.

2. An inertia wheel as claimed in claim 1, further characterized by solid state electronic means connected to said stator to effect motor control based on an appropriate detection function by switching the sets of coils, said sets of coils by permutation of the order of activation effecting reversal of the direction of rotation of the motor.

3. An inertia wheel as claimed in claim 1, in which, when said motor operates in the generator mode, axial slaving means connected to said axial rate detector are energized by tapping the necessary energy from the kinetic energy of said rotor.

4. An inertia wheel as claimed in claim 1, further characterized by
a means for enclosing the field of magnetic flux connecting said ring of permanent magnets and said winding of said stator including
ferromagnetic rings associated with said ring of permanent magnets and said stator winding mounted fast with said rotor on opposite sides of said stator winding, one of said ferromagnetic rings mounted on said rotor with said ring of permanent magnets on the opposite side of said ring of permanent magnets from said stator winding.

5. An inertia wheel as claimed in claim 1, further characterized by said stator having a stator reactor forming a signal and having an air gap for modifying the quality factor of the signal, a 1 MHz generator means connected to said stator to detect rotation of said motor by modulating said signal formed by said stator reactor, a ferromagnetic means associated with said stator reactor and mounted fast with said rotor and formed with windows therein, the width of said windows determining the shape of said signals.

6. An inertia wheel as claimed in claim 4, in which a system delivering steering commands controls the application of currents to said switching means.

7. An inertia wheel as claimed in claim 5, the which said windows are switching windows which have a width equal to $P_p/2$ and a mutual spacing of $P_p$, and said stator reactor has pairs of main and redundant detectors operatively associated therewith which are respectively spaced $P_p/2$ from each other and the ones from the others are spaced $P_p$ apart.

* * * * *